United States Patent
Chin

(10) Patent No.: US 7,455,821 B2
(45) Date of Patent: *Nov. 25, 2008

(54) PROCESS FOR PRODUCTION OF A BOROHYDRIDE COMPOUND

(75) Inventor: Arthur Achhing Chin, Cherry Hill, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/900,491

(22) Filed: Sep. 12, 2007

(65) Prior Publication Data

US 2008/0069752 A1    Mar. 20, 2008

Related U.S. Application Data

(62) Division of application No. 11/098,734, filed on Apr. 4, 2005, now Pat. No. 7,297,316.

(51) Int. Cl.
    *C01B 35/00* (2006.01)

(52) U.S. Cl. ..................... 423/286; 423/288

(58) Field of Classification Search ................. 423/286, 423/288
    See application file for complete search history.

(56) References Cited

U.S. PATENT DOCUMENTS

| | | | |
|---|---|---|---|
| 2,534,533 A | 12/1950 | Schlesinger et al. |
| 3,002,806 A | 10/1961 | Governale et al. |
| 3,077,376 A | 2/1963 | Schubert et al. |
| 3,140,150 A | 7/1964 | Goerrig et al. |
| 3,151,945 A | 10/1964 | Konrad et al. |
| 3,164,441 A | 1/1965 | Dieter |
| 3,471,268 A | 10/1969 | Bontempelli et al. |
| 3,473,899 A | 10/1969 | Cooper |
| 3,505,035 A | 4/1970 | Schubert et al. |
| 6,251,349 B1 | 6/2001 | Zaluska et al. |
| 7,297,316 B2 | 11/2007 | Chin |
| 2004/0191152 A1 | 9/2004 | Amendola et al. |
| 2005/0207959 A1 | 9/2005 | Zhou |
| 2006/0013753 A1 | 1/2006 | Vajo et al. |

FOREIGN PATENT DOCUMENTS

| | | |
|---|---|---|
| DE | 1 053 476 | 8/1957 |
| JP | 4224585 | 8/1992 |
| JP | 2002-193604 | 7/2002 |
| JP | 2004-010446 | 1/2004 |

OTHER PUBLICATIONS

Kojima et al., Recycling Process of Sodium Metaborate to Sodium Borohydride, International Journal of Hydrogen Energy, vol. 28, pp. 989-993 (2003).

Li et al., "Preparation of Sodium Borohydride by the Reaction of MgH2 With Dehydrated Borax Through Ball . . . ", J. Alloys and Compounds, vol. 349, No. 1-2, pp. 232-236 (2003).

Li et al., "Preparation of Potassium Borohydride by a Mechano-Chemical Reaction of Saline Hydrides With . . . ", J. Alloys and Compounds, vol. 354, No. 1-2, pp. 243-247 (2003).

Kirk-Othmer, Encyclopedia of Chemical Technology, John Wiley & Sons (1997), vol. 22, pp. 529, 530.

*Primary Examiner*—Wayne Langel
(74) *Attorney, Agent, or Firm*—Kenneth Crimaldi

(57) ABSTRACT

A process for production of a borohydride compound. The process comprises the steps of: (a) combining a boron-containing salt, at least one of a metal and its hydride; wherein the metal is Be, Mg, Ca, Sr, Ba, Al, Ga, Si or a transition metal; and a solvent in which the borohydride compound is soluble; (b) grinding a mixture formed in step (a) to form the borohydride compound; and (c) separating a solution comprising the borohydride compound.

4 Claims, No Drawings

PROCESS FOR PRODUCTION OF A BOROHYDRIDE COMPOUND

CROSS REFERENCE TO RELATED PATENT APPLICATIONS

This is a divisional application of prior U.S. application Ser. No. 11/098,734 filed on Apr. 4, 2005 now U.S. Pat. No. 7,297,316.

BACKGROUND

This invention relates generally to a process for production of a borohydride compound from boron-containing salts and metals or metal hydrides.

Production of sodium borohydride from sodium metaborate and alkali metal hydrides or alkaline earth hydrides or aluminum hydride is described in U.S. Pat. No. 3,140,150. An equation describing the reaction for magnesium hydride is as follows:

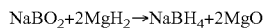
$$NaBO_2 + 2MgH_2 \rightarrow NaBH_4 + 2MgO$$

It is also known in the prior art to react sodium borate salts, aluminum and hydrogen to produce sodium borohydride, as follows:

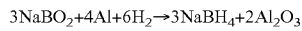
$$3NaBO_2 + 4Al + 6H_2 \rightarrow 3NaBH_4 + 2Al_2O_3$$

However, elevated temperatures and pressures typically are required in the prior art processes. Moreover, the number of disclosed metals and metal hydrides is limited.

The problem addressed by this invention is to find an efficient and economical process for production of a borohydride compound from boron-containing salts and metals or metal hydrides.

STATEMENT OF INVENTION

The present invention is directed to a process for production of a borohydride compound. The process comprises the steps of: (a) combining a boron-containing salt, at least one of a metal and its hydride; wherein the metal is Be, Mg, Ca, Sr, Ba, Al, Ga, Si or a transition metal; and a solvent in which the borohydride compound is soluble; (b) grinding a mixture formed in step (a) to form the borohydride compound; and (c) separating a solution comprising the borohydride compound.

The present invention is further directed to a process for production of a borohydride compound. The process comprises the steps of: (a) combining a boron-containing salt, and at least one of a metal and its hydride; wherein the metal is Al, Si or a transition metal; and (b) grinding a mixture formed in step (a) to form the borohydride compound.

DETAILED DESCRIPTION

All percentages are weight percentages based on the entire composition described, unless specified otherwise. A "transition metal" is any element in groups 3 to 12 of the IUPAC periodic table, i.e., the elements having atomic numbers 21-30, 39-48, 57-80 and 89-103. A "boron-containing salt" is an acid or salt containing a complex anion of boron, preferably a complex anion containing only boron and oxygen. Most preferably, a boron-containing salt is an acid or salt containing a $B_4O_7^{-2}$ or $BO_2^{-1}$ ion, preferably the sodium salt. Preferably, the borohydride compound is sodium, potassium or calcium borohydride; most preferably sodium borohydride; and the boron-containing salt is a sodium salt. If a sodium salt of a boron compound having unequal molar amounts of sodium and boron, e.g., $Na_2B_4O_7$ is used as the boron-containing salt, preferably sodium hydroxide is added to provide the preferred Na:B molar ratio of 1:1.

In those embodiments using a solvent, suitable solvents are those in which the borohydride compound is soluble and which are relatively unreactive with borohydride, and with the metal and/or metal hydride used. A solvent in which the borohydride compound is soluble is one in which the borohydride compound is soluble at least at the level of 2%, preferably, at least 5%. Preferred solvents include liquid ammonia, alkyl amines, heterocyclic amines, alkanolamines, alkylene diamines, glycol ethers, amide solvents (e.g., heterocyclic amides and aliphatic amides), dimethyl sulfoxide and combinations thereof. Preferably, the solvent is substantially free of water, e.g., it has a water content less than 0.5%, more preferably less than 0.2%. Especially preferred solvents include ammonia, $C_1$-$C_4$ alkyl amines, pyridine, 1-methyl-2-pyrrolidone, 2-aminoethanol, ethylene diamine, ethylene glycol dimethyl ether, diethylene glycol dimethyl ether, triethylene glycol dimethyl ether, tetraethylene glycol dimethyl ether, dimethylformamide, dimethylacetamide, dimethylsulfoxide and combinations thereof. Preferably, the metal oxide produced in the reaction is substantially insoluble in the solvent. Preferably, the solubility of the metal oxide is less than 0.1%. Use of a solvent also allows the reaction to be run more easily as a continuous process. Moreover, the solvent facilitates heat transfer, thereby minimizing hot spots and allowing better temperature control. Recycle of the solvent is possible to improve process economics. In another embodiment of the invention, a mineral oil is used as the solvent to allow higher reaction temperatures. Separation of the borohydride compound from the oil may be accomplished via an extraction process after the oil is removed from the reactor.

The method of this invention uses at least one of a metal and its hydride, i.e., one or more metals may be present, one or more metal hydrides may be present, or a combination of metals and metal hydrides may be present. The term "metal hydride" refers only to a simple metal hydride which is a compound of a single metal and hydrogen, and not to complex hydrides, e.g., lithium aluminum hydride. The metals and metal hydrides are selected from Be, Mg, Ca, Sr, Ba, Al, Ga, Si and the transition metals. Preferably, the metals and metal hydrides are selected from Be, Mg, Ca, Sc, Y, La, Ti, Zr, V, Cr, Mn, Fe, Co, Ni, Cu, Zn, Al and Si. More preferably, the metals and metal hydrides are selected from Mg, Ca, La, Ti, Zr, Zn, Al and Si. In one preferred embodiment, the metals and metal hydrides are selected from Mg, Ca, Zn, Al and Si, preferably as the metal rather than the metal hydride. In another embodiment of the invention, elements are chosen to maximize reaction efficiency. For example, the general reactions of sodium metaborate with metals, M, or their hydrides, $M_xH_y$, are as shown below:

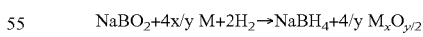
$$NaBO_2 + 4x/y\ M + 2H_2 \rightarrow NaBH_4 + 4/y\ M_xO_{y/2}$$

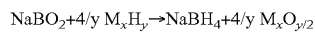
$$NaBO_2 + 4/y\ M_xH_y \rightarrow NaBH_4 + 4/y\ M_xO_{y/2}$$

Reaction efficiency would be maximized by selecting metals for which the ratio x/y is minimized; for example, the metals and/or metal hydrides of La, Y, Sc, Ti, Zr, Al and Si.

Grinding of the reactants will accelerate the reaction, and may be achieved using any method which applies energy to solid particles to induce a mechanochemical reaction, especially any method which reduces solids to the micron size range, preferably the sub-micron size range, and continually exposes fresh surfaces for reaction, e.g., impact, jet or attrition milling. Preferred methods include ball milling, vibratory (including ultrasonic) milling, air classifying milling, universal/pin milling, jet (including spiral and fluidized jet) milling, rotor milling, pearl milling. Especially preferred methods are planetary ball milling, centrifugal ball milling, and similar types of high kinetic energy rotary ball milling. Preferably, milling is performed in either a hydrogen atmosphere, or an inert atmosphere, e.g., nitrogen. In an embodiment in which a solvent is used, grinding of the reactants may be achieved using any method suitable for grinding a slurry.

Another method to accelerate the reaction is to use radiation techniques alone or in combination with reactive milling. For example, microwave irradiation can direct energy at specific reaction surfaces to provide rapid heating and deep energy penetration of the reactants. Microwave absorbers such as metal powders, which could be used as milling media, and dipolar organic liquids may also be added to the reaction system to promote the reaction. The advantage of these techniques is that high reaction rates may occur at considerably lower processing temperature than could be obtained with resistive heating thermal techniques.

Without being bound by theory, it is believed that methods allowing use of a lower reaction temperature are beneficial, as the reaction equilibrium becomes less favorable at higher temperatures. Preferably, the reaction temperature is less than 250° C., and more preferably less than 150° C., when the grinding is carried out without a solvent. When a solvent is used, the preferred reaction temperature is below the boiling point of the solvent at the pressure within the grinding equipment. Preferably, the pressure is in the range from 100 kPa to 7000 kPa, more preferably from 100 kPa to 2000 kPa.

Materials that catalyze surface hydride formation from gas phase hydrogen can be used to further hydriding kinetics. Examples of suitable catalysts include powders of the transition metals, and their oxides, preferably La, Sc, Ti, V, Cr, Mn, Fe, Ni, Pd, Pt and Cu; oxides of silicon and aluminum, preferably alumina and silica; and $AB_2$, $AB_5$, AB, and $A_2B$ types of alloys, wherein A and B are transition metals, such as FeTi and $LaNi_5$. A comprehensive list of hydriding alloys is given at the Sandia National Laboratory website at hydpark.ca.sandia.gov/.

In one embodiment of the invention in which the boron-containing salt is combined with a metal, hydrogen gas is necessary, as shown in the equations provided above. In this embodiment, the pressure of hydrogen preferably is from 100 kPa to 7000 kPa, more preferably from 100 kPa to 2000 kPa.

After the reaction has proceeded substantially to completion, preferably the borohydride product is separated from the metal oxide byproducts. In one embodiment in which a solvent is used, the solvent is separated from the insoluble metal oxide product and any grinding medium, which also would be insoluble. The borohydride compound can then be separated from the solvent by conventional methods. For example, the borohydride compound-rich solvent can removed by filtering or using any other conventional solid-liquid separation device such as a centrifuge. The insoluble solid metal oxide is collected and dried. High purity borohydride compound can be recovered from the solvent phase by evaporating the solvent or by lowering temperature to crystallize or precipitate the borohydride compound product. The preferred method will depend on the solubility-temperature profile of the solvent selected. Additional solvent washes can be used to improve recovery and purity. The metal oxide can be reduced back to the metal in a subsequent step to develop a recycle loop for the process.

The liquid stream can also be withdrawn during the course of the reaction to remove the borohydride compound and the solvent returned to the reactor to lower the reactor borohydride compound content and drive the reaction further to completion. As such, reactions that may be equilibrium constrained may be enhanced for higher yields. The formation of borohydride is also highly exothermic. By cooling the solvent return stream to the reactor, a means for controlling reaction temperature is also provided. For example, the withdrawn solvent will be at the reactor temperature. If this stream is sufficiently cooled, borohydride compound crystals will form and can be removed using conventional methods as described above. The cooled solvent of lower borohydride compound content is returned to the reactor to maintain reactor temperature at the target condition.

The invention claimed is:

1. A process for production of a borohydride compound; said process comprising steps of:
   (a) combining a boron-containing salt and silicon hydride to form a reaction mixture; and
   (b) grinding the reaction mixture formed in step (a) to form the borohydride compound.

2. The process of claim 1 further comprising combining a mineral oil with the boron-containing salt and silicon hydride to form the reaction mixture.

3. The process of claim 1 in which the borohydride compound is sodium borohydride.

4. The process of claim 1 further comprising a catalyst selected from the group consisting of powders of the transition metals and their oxides.

\* \* \* \* \*